United States Patent
Lefrere et al.

(10) Patent No.: US 9,493,372 B2
(45) Date of Patent: Nov. 15, 2016

(54) INSTALLATION AND METHOD FOR MELTING GLASS

(71) Applicant: SAINT-GOBAIN ISOVER, Courbevoie (FR)

(72) Inventors: Yannick Lefrere, Choisy au Bac (FR); Frederic Lopepe, Rosny Sous Bios (FR); Mathieu Rayer, Vienne (FR); Gregoire Villeroy de Galhau, Paris (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 10 days.

(21) Appl. No.: 14/407,343

(22) PCT Filed: Jun. 11, 2013

(86) PCT No.: PCT/FR2013/051353
§ 371 (c)(1),
(2) Date: Dec. 11, 2014

(87) PCT Pub. No.: WO2013/186480
PCT Pub. Date: Dec. 19, 2013

(65) Prior Publication Data
US 2015/0175464 A1 Jun. 25, 2015

(30) Foreign Application Priority Data
Jun. 12, 2012 (FR) .................................... 12 55476

(51) Int. Cl.
*C03B 5/182* (2006.01)
*C03B 5/04* (2006.01)
(Continued)

(52) U.S. Cl.
CPC ............... *C03B 5/182* (2013.01); *C03B 5/04* (2013.01); *C03B 5/20* (2013.01); *C03B 5/2356* (2013.01);
(Continued)

(58) Field of Classification Search
CPC ....... C03B 5/04; C03B 5/2356; C03B 5/265; C03B 5/44; C03B 5/20; C03B 5/182; C03B 2211/70; C03B 2211/22; C03B 2211/23; C03B 2211/40
See application file for complete search history.

(56) References Cited

U.S. PATENT DOCUMENTS 4,634,461 A 1/1987 Demarest, Jr. et al.
4,780,121 A * 10/1988 Matesa ..................... C03B 5/00
62/134

(Continued)

FOREIGN PATENT DOCUMENTS

EP 0 135 446 3/1985
EP 0 209 718 1/1987
(Continued)

OTHER PUBLICATIONS

International Search Report Issued Sep. 4, 2013 in PCT/FR13/051353 Filed Jun. 11, 2013.

*Primary Examiner* — Queenie Dehghan
(74) *Attorney, Agent, or Firm* — Oblon, McClelland, Maier & Neustadt, L.L.P.

(57) ABSTRACT

A plant for melting glass or rock including: a first melting tank including a batch material inlet, a heater that makes it possible to heat the batch materials until a liquid glass is obtained; a liquid glass outlet; and downstream of the melting tank, a second heating tank including metallic walls that are not covered with refractory insulating materials and that include a system of internal ducts allowing circulation of a coolant, a plurality of injectors of submerged burners, and a liquid glass outlet, in a form of an overflow, which limits a height of the glass bath in the heating tank to a value between 50 mm and 300 mm. A process for melting glass or rock uses such a melting plant.

22 Claims, 1 Drawing Sheet

(51) Int. Cl.
*C03B 5/235* (2006.01)
*C03B 5/26* (2006.01)
*C03B 5/44* (2006.01)
*C03B 5/20* (2006.01)
*F27B 3/04* (2006.01)
*F27B 3/20* (2006.01)

(52) U.S. Cl.
CPC ............... *C03B 5/265* (2013.01); *C03B 5/44* (2013.01); *F27B 3/04* (2013.01); *F27B 3/045* (2013.01); *F27B 3/205* (2013.01); *C03B 2211/22* (2013.01); *C03B 2211/23* (2013.01); *C03B 2211/40* (2013.01); *C03B 2211/70* (2013.01); *Y02P 10/143* (2015.11)

(56) References Cited

U.S. PATENT DOCUMENTS

| | | | |
|---|---|---|---|
| 4,929,266 A * | 5/1990 | Cozac | C03B 5/03 65/134.5 |
| 7,578,988 B2 * | 8/2009 | Jacques | C01B 33/20 423/326 |
| 2006/0291528 A1 * | 12/2006 | Kiefer | C03B 5/021 373/147 |
| 2008/0256981 A1 * | 10/2008 | Jacques | C03B 3/02 65/19 |
| 2009/0235695 A1 * | 9/2009 | Pierrot | C03B 5/20 65/356 |
| 2010/0242543 A1 * | 9/2010 | Ritter | C03B 5/021 65/178 |
| 2011/0088432 A1 * | 4/2011 | Purnode | C03B 5/04 65/181 |
| 2011/0159198 A1 * | 6/2011 | McLean | C23C 16/453 427/446 |
| 2011/0236846 A1 * | 9/2011 | Rue | F27B 3/205 432/195 |
| 2011/0308280 A1 | 12/2011 | Huber | |

FOREIGN PATENT DOCUMENTS

| | | |
|---|---|---|
| EP | 2 397 446 | 12/2011 |
| FR | 2 281 902 | 3/1976 |
| FR | 2 613 351 | 10/1988 |
| SU | 501258 | 5/1976 |

* cited by examiner

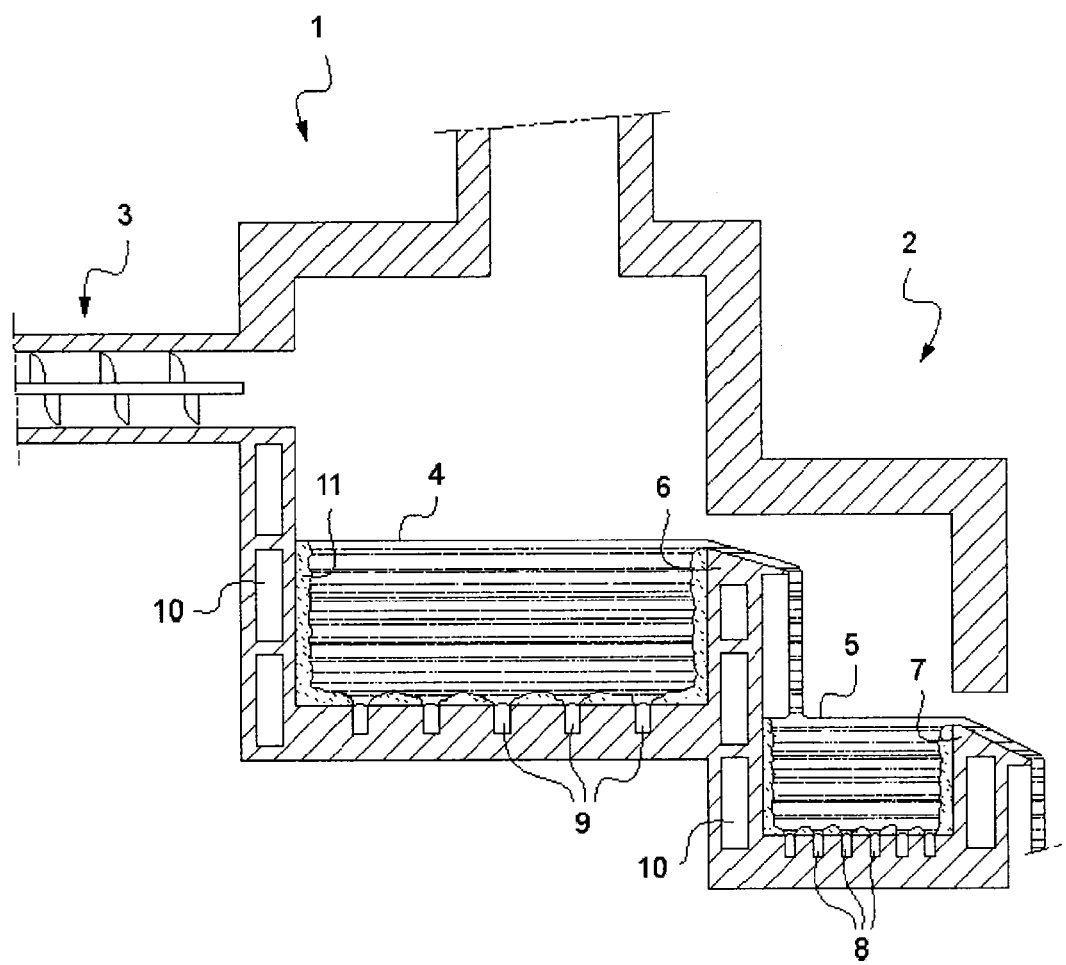

INSTALLATION AND METHOD FOR MELTING GLASS

The present invention relates to a plant for melting glass or rock, in particular with a view to manufacturing mineral wools, preferably rockwool, comprising a melting unit and a high-temperature rapid heating unit, and also to a process for melting glass or rock using such a plant.

The melting of rock (basalt or blast furnace slag) generally requires heating of the raw materials to temperatures significantly higher than the melting of standard glass. It is traditionally carried out in cubilot furnaces, heated with large amounts of coke to temperatures close to 1500° C. This is because the refractory furnaces conventionally used for melting glass do not withstand the high temperatures necessary for melting rock.

The applicant has recently proposed, in French application 1251170 filed on 8 Feb. 2012, a novel furnace that makes it possible to carry out the melting of rock at high temperature (around 1500° C.) in a submerged burner furnace, whereas this type of furnace had been used until then above all for melting glass. This novel furnace comprises bare metallic walls, that is to say which are not protected by refractory materials, through which a system of internal ducts passes, in which ducts a coolant, for example water, is circulated. In a furnace of this type, referred to hereinbelow as a waterjacket furnace, a solid layer of more or less devitrified glass forms at the interface between the liquid glass bath and the cooled walls and protects the latter against wear and oxidation.

It is readily understood that this solution that consists in carrying out high-temperature melting in a furnace in which the walls are not only devoid of an insulating refractory coating but are actively cooled is extremely energy-expensive.

When such a waterjacket furnace is used both to melt the batch materials and bring them to the temperature necessary for spinning the glass wool or rockwool, the energy consumption is particularly high since a high temperature differential is then maintained for a long period, over a large contact area.

The present invention proposes to modify a plant for melting glass or rock as described in French application 1251170, for the purpose of significantly reducing the energy consumption of a melting process using such a plant. Although the benefit of the proposed modification, described in detail below, is particularly significant for a plant for melting rock at high temperature using a furnace having actively cooled metallic walls, this benefit also exists, to a lesser extent, for plants having a conventional furnace made of refractory concrete or for glass melting processes that use lower temperatures.

This is why, although the application of the present invention to processes for melting rock in waterjacket furnaces corresponds to a preferred embodiment, the present invention is in no way limited to such an application and may be used advantageously for glass melting plants of a different type and for standard glass melting processes.

The idea at the root of the present invention was to dissociate the step of melting batch materials requiring relatively low temperatures but quite a long time from the high-temperature heating step of the molten material and to carry out these two steps in separate units or tanks. During the first step (melting step), preferably carried out in a waterjacket furnace, the energy consumption is thus advantageously limited owing to the fact that the raw materials are brought to temperatures that are relatively low but sufficient to enable the raw materials to be melted and a liquid to be obtained. The low-temperature melt is then transferred to a second unit, referred to hereinbelow as "heating unit" or "rapid heating unit" or "flash unit", where it is heated by submerged burners in a volume that is optimized in order to reduce the contact area and contact time between the very hot glass and the cooled walls of the heating unit as much as possible.

The loss of thermal energy in such a heating unit is essentially proportional to the contact area between the bath of molten materials and the cooled walls, and this contact area depends to a very great extent on the height of the bath of molten materials which should therefore be reduced as much as possible. In such a heating unit having submerged burners, the reduction of the height of the bath is, however, limited by the efficiency of the heat transfer between the hot combustion gas, produced by the burners, and the glass bath. Indeed, when the bath of molten materials has an insufficient depth, the combustion gas rising from the injectors of the submerged burners to the surface of the glass cannot transfer all its thermal energy to the bath. When the temperature of the combustion gas is greater than the temperature of the bath at the moment when the gas bubbles reach the surface of the glass, some of the thermal energy will escape with the combustion gases, which is unfavorable for the energy balance of the process. Consequently, the faster the heat transfer is between the combustion gas and the glass bath, the lower the height of the bath may be.

In order to be able to use a glass bath with a low height, the efficiency of the heat transfer is optimized in the present invention owing to the use of a large number of injectors of small size and of low power dispensing small bubbles of combustion gas. This results in an increase in the heat exchange surface between the combustion gas and the bath and a slowing down of the rise of the gas bubbles in the viscous glass bath.

The three essential elements for the present invention are therefore:
- the dissociation of the melting tank and of the heating tank of the plant,
- the sizing of the melting tank with a low glass bath height, and
- the use of a plurality of low-power submerged burner injectors.

More particularly, the subject of the present invention is a plant for melting glass or rock comprising:
- a first tank, referred to as a melting tank, with a batch material inlet, heating means that make it possible to heat the batch materials until a liquid glass is obtained, a liquid glass outlet and, downstream of the melting tank,
- a second tank, referred to as a heating tank, with metallic walls that are not covered with refractory insulating materials and that are provided with a system of internal ducts allowing the circulation of a coolant, and a plurality of injectors of submerged burners, the heating tank comprising a liquid glass outlet, in the form of an overflow, which limits the height of the glass bath in the heating tank to a value between 20 mm and 300 mm, preferably between 50 mm and 200 mm and in particular between 70 and 120 mm.

The expression "liquid glass" as it is used in the present invention encompasses both the liquid glass obtained by melting silica sand but also the liquid glasses obtained by melting rock, in particular basalt rock and blast furnace slags, and also all the mixtures of these two types of batch materials optionally containing recycled batch materials (cullet) and conventional adjuvants such as fluxes or refining agents.

The liquid glass obtained at the outlet of the melting tank is sufficiently fluid to be able to flow from the melting tank to the rapid heating tank. Its viscosity is preferably between 3 and 100 poise. The liquid glass may contain a certain fraction of infusible materials which is generally less than 5%. The overall content of (fusible and infusible) unmelted materials of the liquid glass obtained at the outlet of the melting unit is less than 10%, preferably less than 5%.

The melting tank and the rapid heating tank preferably have different capacities, that of the heating tank being less than the melting tank. The capacity of the tanks is understood to mean the volume of the glass bath that they contain when the plant is operating. This volume is equal to the product of the surface area of the bottom of the tank and the height of the glass bath, the latter being established by the position of the liquid glass outlet. The capacity of the melting and rapid heating tanks of the plant of the present invention can therefore be determined on the plant during operation, but also on an empty plant. The ratio of the capacity of the rapid heating tank to the capacity of the melting tank is preferably between 1/1000 and 1/3, in particular between 1/100 and 1/10.

The liquid glass outlet of the melting tank is preferably an overflow enabling the liquid glass to flow directly into the heating tank, preferably without coming into contact with other elements of the furnace. The height of the overflow of the melting tank must be high enough to avoid any risk of hot glass returning by sputtering. The level of the overflow of the melting tank (=level of the glass bath in the melting tank) is preferably located at at least 500 mm, preferably at at least 1000 mm above the level of the overflow of the heating tank (=level of the glass bath in the heating tank).

The geometry of the overflow region may advantageously be configured (height and/or orientation of the walls) in order to optimize the flows of liquid and gas between the overflow and the heating chamber.

As explained in the introduction, in order to be able to operate with a low glass bath height, the rapid heating tank must comprise a large number of injectors operating at low power and each delivering small-sized bubbles of combustion gas. Each injector may be one submerged burner, or else one submerged burner may comprise a plurality of injectors. A submerged burner comprising an alignment of a plurality of low-power individual injectors is described in detail in French application 1251170 in the name of the applicant.

The heating tank of the plant of the present invention preferably comprises a number of submerged burner injectors of between 50 and 300/m², preferably between 80 and 250/m² and in particular between 90 and 180 burners per m² of bottom. These injectors are preferably arranged uniformly over the entire bottom of the heating tank. When the melting tank comprises submerged burners comprising an alignment of injectors, these burners are preferably positioned at an equal distance from one another and parallel to one another, in particular perpendicular to the flow direction of the glass.

The total surface area of the bottom of the rapid heating tank is preferably between 0.05 and 5 m², more preferably between 0.1 and 3 m² and in particular between 0.2 and 2 m².

The total number of injectors of the heating tank is advantageously between 50 and 1000, preferably between 100 and 500.

The submerged burners of the heating tank are preferably supplied with a mixture of oxygen and gaseous fuel, for example methane. The use of a submerged burner for the combustion of an air/gas mixture is indeed less satisfactory from an energy efficiency viewpoint: the energy transfer efficiency of an air/glass flame in a molten glass bath at 1500° C. is around 27% only whereas it is equal to around 75% for an $O_2$/gas flame.

This advantage of a better energy efficiency is, however, accompanied by an increase in problems of oxidation of the furnace walls, these problems being even greater when the oxygen content of the oxidant and the temperature of the flame are high. Yet a gas/$O_2$ flame has a temperature of around 3000 K, considerably higher than the temperature of a gas/air flame which is only 2000 K approximately.

In order to protect the bare metallic walls of the rapid heating tank against oxidative degradation, it is important to maintain, on these walls, the layer of solidified glass, mentioned in the introduction. For this, it will advantageously be ensured that the distance between the metallic walls of the heating tank and the closest injector is between 20 mm and 150 mm, preferably between 30 and 100 mm.

Although the height of the liquid glass bath in the heating tank is an important parameter for acting on the energy losses, this is not the only parameter to be taken into consideration. Indeed, for a given glass bath height, the energy losses from the heating tank will be even lower when the length/width ratio is close to 1. The bottom of the heating tank of the plant of the present invention, when it is rectangular, consequently has a relatively small length/width ratio, preferably between 1 and 4, in particular between 1 and 3. It would of course also be possible to envisage tanks with non-rectangular bottoms. A person skilled in the art will not find it difficult to size the tanks so that the perimeter/surface area ratio of the bottom is as low as possible.

Another subject of the present invention is a process for melting glass or rock using a plant according to the invention. This process is a continuous process and the steps described below must be understood as being carried out simultaneously and continuously.

More particularly, the process for melting glass or rock of the present invention comprises:
  supplying the melting tank with solid batch materials;
  heating said batch materials until a liquid glass is obtained;
  transferring the liquid glass obtained from the melting tank to the heating tank;
  heating the liquid glass, in the heating tank, by means of the submerged burners, from an inlet temperature ($T_1$) to an outlet temperature ($T_2$) at least 50° C. above the temperature $T_1$; and
  cooling the metallic walls of the heating tank by circulation of a coolant in the system of internal ducts.

As mentioned in the introduction, the heating tank may be a refractory furnace, conventionally used for melting glass starting from silica sand and heated, for example, by electrodes, resistors, roof-mounted burners and submerged burners. In one preferred embodiment of the process of the present invention, the melting tank, like the heating tank, is a tank having metallic walls cooled by a coolant and operating with submerged burners.

The temperature of the glass bath at the outlet of the melting tank ($T_1$) is preferably at most equal to 1400° C., in particular at most equal to 1350° C., ideally at most equal to around 1300° C. This temperature depends above all on the melting behavior of the batch materials and on their melt viscosity. The lower the melting temperature and the melt viscosity of the raw materials, the lower the temperature ($T_1$) at which the liquid glass is transferred from the melting tank to the rapid heating tank. It is assumed here, by approximation, that $T_1$ is the temperature of the glass bath at the outlet of the melting tank and the temperature of the liquid glass at the inlet of the heating tank where it is heated from $T_1$ up to $T_2$ that is at least 50° C. higher than $T_1$. The difference between $T_2$ and $T_1$ is preferably between 50° C. and 300° C., in particular between 100° C. and 300° C., and ideally between 150° C. and 280° C.

The submerged burners of the heating tank, generally numbering 50 to 1000, deliver a power per unit of bottom area of between 0.2 and 2 megawatts/m² of tank bottom, preferably between 0.3 and 1.8 megawatts/m², each of the submerged burner injectors preferably delivering a unit power of between 2 and 20 kW.

The size of the glass melting plant of the present invention is not particularly limited and the plant may operate, for example, with an output of between 10 and 500 tonnes per 24 hours.

The heating tank of the plant of the present invention generally has dimensions of less than those of the heating tank, and the glass thus advantageously stays longer in the melting tank operating at a relatively low temperature than in the rapid heating tank where the energy losses due to a temperature differential between the walls and the glass bath are particularly high. In other words, the heating tank operates with a specific output, expressed in tones per day and per m² of tank bottom, of greater than or equal to the specific output of the melting tank. The ratio of the specific output of the heating tank to the specific output of the melting tank is advantageously between 1 and 100, preferably between 2 and 30.

The plant and the melting process of the present invention are now illustrated with reference to the single appended FIGURE that schematically represents, in cross section, a glass melting plant according to the invention during operation.

This plant comprises a melting tank 1 and a rapid heating tank 2, situated downstream of the melting tank. The batch materials are introduced into the melting tank 1 via a batch charger 3. The melting tank 1 and the heating tank 2 comprise, at their bottom, submerged burners 8, 9. In each of the tanks 1, 2 the level of the glass bath 4, 5 is determined by the position of an overflow 6, 7 through which the liquid glass flows. The liquid glass obtained at the outlet of the melting tank 1 flows through the overflow 6 directly into the melting tank 2 where it is heated from the temperature $T_1$ to the temperature $T_2$. The two tanks comprise metallic walls passed through by a system of internal ducts 10 in which a coolant circulates. The active cooling of the walls results in the formation of a layer of solidified glass 11 which insulates the metallic walls from the glass bath.

The invention claimed is:

1. A plant for melting glass or rock comprising:
  a melting tank including:
    a batch material inlet configured to receive batch material,
    heating means for heating the batch material until a liquid glass is obtained, and
    a liquid glass outlet;
  a heating tank, downstream of the melting tank, configured to receive the liquid glass from the melting tank, the heating tank having metallic walls that are not covered with refractory insulating materials and that include a system of internal ducts allowing circulation of a coolant that cools the metallic walls by circulation of the coolant in the system of internal ducts, the heating tank including:
    a plurality of injectors of submerged burners configured to heat the liquid glass from an inlet temperature $T_1$ to an outlet temperature $T_2$ at least 50° C. above the temperature $T_1$, and
    a liquid glass outlet, in a form of an overflow, which limits a height of the glass bath in the heating tank to a value between 20 mm and 300 mm,
  wherein a number of injectors of submerged burners of the heating tank is between 50 and 300/m².

2. The plant as claimed in claim 1, wherein a capacity of the heating tank is less than that of the melting tank, the ratio of the capacity of the heating tank to a capacity of the melting tank being between 1/1000 and 1/3.

3. The plant as claimed in claim 1, wherein the liquid glass outlet from the melting tank is an overflow enabling the liquid glass to flow directly into the heating tank.

4. The plant as claimed in claim 1, wherein a total surface area of a bottom of the heating tank is between 0.05 and 5 m².

5. The plant as claimed in claim 1, wherein a total number of injectors of the heating tank is between 50 and 1000.

6. The plant as claimed in claim 1, wherein a distance between the metallic walls of the heating tank and the closest injector is between 20 mm and 150 mm.

7. The plant as claimed in claim 1, wherein a bottom of the heating tank has a length/width ratio between 1 and 4.

8. The plant as claimed in claim 1, wherein the height of the glass bath in the heating tank is between 50 mm and 200 mm.

9. The plant as claimed in claim 1, wherein the height of the glass bath in the heating tank is between 70 and 120 mm.

10. A continuous process for melting glass or rock using a melting plant having a melting tank including a batch material inlet, heating means for heating batch material until a liquid glass is obtained, and a liquid glass outlet, and a heating tank, downstream of the melting tank, including metallic walls that are not covered with refractory insulating materials and that include a system of internal ducts allowing circulation of a coolant, a plurality of injectors of submerged burners, and a liquid glass outlet, in a form of an overflow, which limits a height of the glass bath in the heating tank to a value between 20 mm and 300 mm, the process comprising:
  supplying the melting tank with batch material;
  heating the batch material until a liquid glass is obtained;
  transferring the liquid glass obtained from the melting tank to the heating tank;
  heating the liquid glass, in the heating tank, from an inlet temperature $T_1$ to an outlet temperature $T_2$ at least 50° C. above the temperature $T_1$, by means of the submerged burners having a plurality of injectors; and
  cooling the metallic walls of the heating tank by circulation of a coolant in the system of internal ducts,
  wherein a number of injectors of submerged burners of the heating tank is between 50 and 300/m².

11. The process as claimed in claim 10, wherein the submerged burners of the heating tank deliver a surface power density of between 0.2 and 2 megawatts/m² of tank bottom.

12. The process as claimed in claim 10, wherein the difference between $T_2$ and $T_1$ is between 50° C. and 300° C.

13. The process as claimed in claim 10, wherein each submerged burner injector delivers a power of between 2 and 20 kW.

14. The process as claimed in claim 10, wherein the submerged burners are supplied with a mixture of oxygen and gaseous fuel.

15. The process as claimed in claim 10, operating with an output between 10 and 500 tonnes per 24 hours.

16. The process as claimed in claim 10, wherein the heating tank operates with a specific output, expressed in tonnes per day and per m$^2$, of greater than or equal to the specific output of the melting tank, the ratio of the specific output of the heating tank to the specific output of the melting tank being between 1 and 8.

17. The process as claimed in claim 10, wherein a capacity of the heating tank is less than that of the melting tank, the ratio of the capacity of the heating tank to a capacity of the melting tank being between 1/1000 and 1/3.

18. The process as claimed in claim 10, wherein the liquid glass outlet from the melting tank is an overflow enabling the liquid glass to flow directly into the heating tank.

19. The process as claimed in claim 10, wherein a total surface area of a bottom of the heating tank is between 0.05 and 5 m$^2$.

20. The process as claimed in claim 10, wherein a total number of injectors of the heating tank is between 50 and 1000.

21. The process as claimed in claim 10, wherein a distance between the metallic walls of the heating tank and the closest injector is between 20 mm and 150 mm.

22. The process as claimed in claim 10, wherein a bottom of the heating tank has a length/width ratio between 1 and 4.

\* \* \* \* \*